United States Patent [11] 3,603,144

[72] Inventor Edward C. Smith
 Madison, Conn.
[21] Appl. No. 860,002
[22] Filed Sept. 22, 1969
[45] Patented Sept. 7, 1971
[73] Assignee Neptune Meter Company
 New York, N.Y.

[54] TORQUE METER
 3 Claims, 5 Drawing Figs.
[52] U.S. Cl. ................................................. 73/136 R,
 73/383
[51] Int. Cl. ................................................. G01l 3/02
[50] Field of Search ................................. 73/136, 59,
 9, 382, 518; 74/99

[56] References Cited
 UNITED STATES PATENTS
2,295,026 9/1942 Brown et al. ................. 73/382
2,313,923 3/1943 Chubb ......................... 73/136
2,403,952 7/1946 Ruge ........................... 73/136
2,564,669 8/1951 Brady .......................... 73/407
2,531,905 11/1950 Carpenter .................... 74/99
2,901,739 8/1959 Freitas ......................... 340/213
3,217,306 11/1965 Hillman ....................... 340/181
 FOREIGN PATENTS
1,538,652 9/1968 France ......................... 601/lB/23
1,538,990 9/1968 France ......................... 601/l Primary Examiner—Richard C. Queisser
Assistant Examiner—John Whalen
Attorneys—Lester W. Clark, Robert S. Dunham, P. E.
 Henninger, Thomas F. Moran, Gerald W. Griffin, R.
 Bradlee Boal, Christopher C. Dunham and Robert Scobey ABSTRACT: A device for measuring low torques, e.g., of the order of a gram-centimeter, and particularly for indicating if a torque is below, within, or above a preselected acceptance range. The device may be used to measure the torque required to turn a meter register.

The device includes two structures, one of which is supported from the other by two or more flexible elements, e.g., strings. The supporting structure is positively rotated and the supported structure turns with the supporting structure only by torque transmitted through the strings. The supported structure is operatively coupled to a rotatable element, such as the shaft of a meter register, which element is subjected to frictional forces. The lag between the supported and the supporting structures is indicative of the frictional force acting on the element.

The lag is measured by means of two Polaroid discs, one affixed to the supporting structure, the other one affixed to the supported structure. A light beam is sent through the two Polaroid discs. A photocell circuit detects the intensity of light passing through for the purpose of giving an indication of the angular displacement between the Polaroid discs. A discriminating circuit determines if the angular displacement, and hence the torque, is below, within, or above a preselected acceptance range, and accordingly actuates suitable indicator lights and/or suitable recorders.

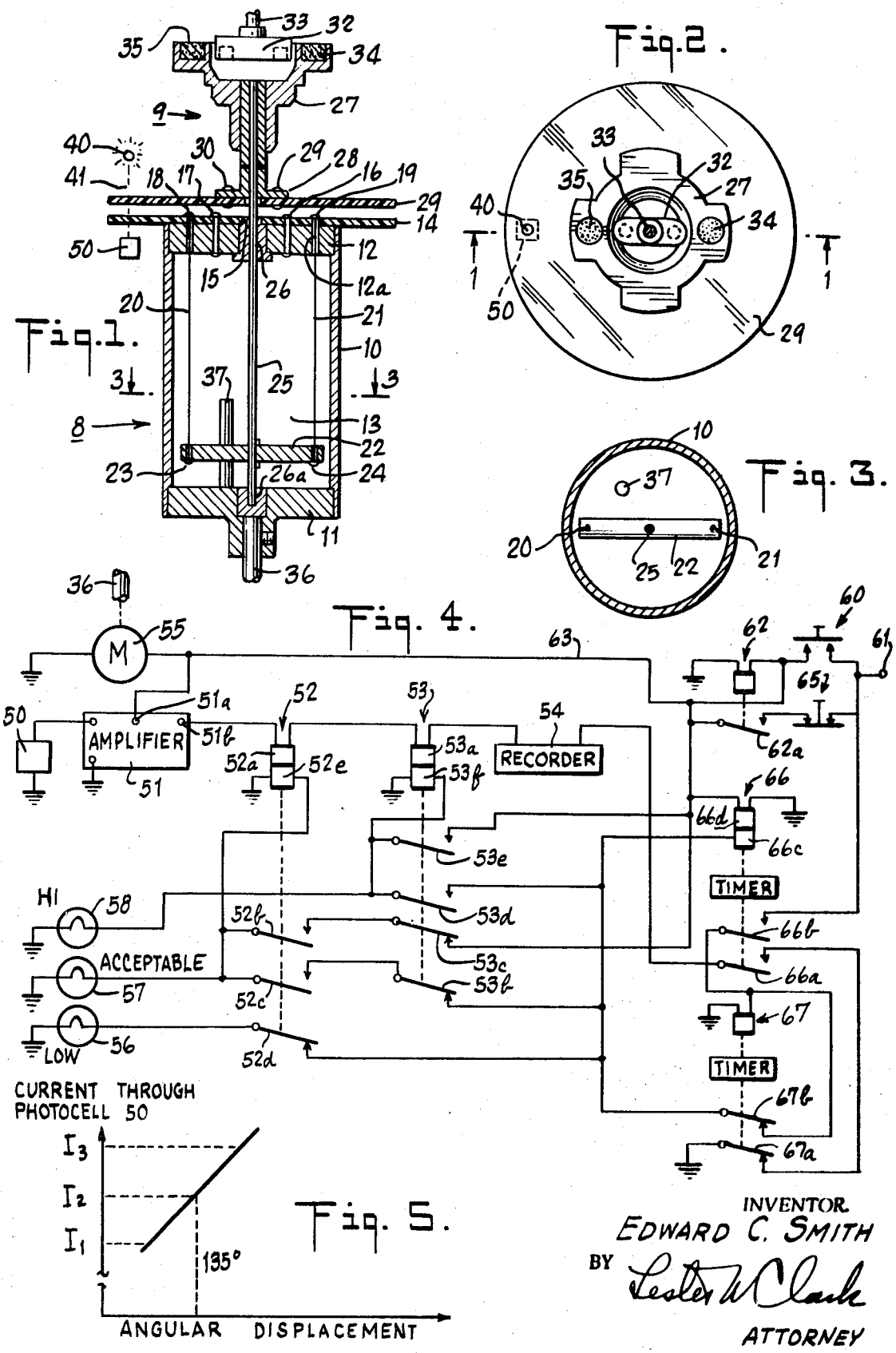

TORQUE METER

BACKGROUND OF THE INVENTION

1. Field of the Invention

The invention relates to devices for measuring torque, and particularly devices for measuring very low torques, of the order of a gram-centimeter, although it is useful for measuring torques in other ranges as well.

2. Description of the Prior Art

Torque has been measured by the extent to which it deforms a spring, which may be a torsion bar, or by means of devices for generating electrical signals upon deformation, or by dynamometers. These methods usually involve some degree of nonlinearity because of the inherent nonlinearity of springs and electric motors. Further, these methods usually involve cumbersome devices when very low torques are measured.

Polarized light has been used in connection with torque measurements, in spring-type torque meters as in Chubb, U.S. Pat. No. 2,313,923 and Bradley, U.S. Pat. No. 2,395,718.

SUMMARY OF THE INVENTION

The invention is in a device for measuring low torques by detecting the rotational lag between a driving supporting structure, and a driven supported structure rigidly coupled to a rotating element subjected to a low torque load, e.g., a frictional load. The invention is particularly directed to a device for indicating whether the torque required to overcome the load is below, within, or above a preselected range.

The supporting structure is shown as a hollow cylinder rotatable about a vertical axis and covered by a top plate having a central aperture. Two or more strings attached to the top plate suspend within the cylinder a bar which is a part of the supported structure. A vertical shaft is rigidly connected to the bar and extends therefrom through the aperture in the top plate where it is journaled so as to be rotatable and vertically slidable. An element subject to frictional forces is coupled to the shaft for rotation therewith.

When the supporting structure is rotated about a vertical axis, the only means of transmitting the rotational motion to the supported structure are the suspending strings. When the supporting structure starts rotating from a position of rest, the supported structure is lifted with respect to the supporting structure and the strings depart from their initial vertical position and assume a diagonal position determined by (1) the weight of the supported structure; (2) the torque transmitted; and (3) the dimensions of the supported and supporting structure and the strings. After a transient interval of acceleration, the supported structure moves at the same speed as the supporting structure, but lagging behind it by an angle corresponding, at any instant, to the torque load represented by the element under test.

The angle of lag is detected by means of a combination of two Polaroid discs and a photocell. One of the Polaroid discs is attached to the supporting structure for rotation therewith, and the other one is attached to the supported structure for rotation therewith. A light beam traverses the two discs and impinges upon the photocell. The amount of light passing through the two Polaroid discs changes with the angular displacement between the discs (at least within a certain angular displacement range) and the changes are detected by the photocell. A discriminating circuit cooperates with the photocell to indicate, by means of suitable indicator lights and/or suitable recorders, if the amount of torque required to turn the supported structure is below, within, or above a preselected torque range. Stop means is provided for preventing angular displacement exceeding a preselected angle.

BRIEF DESCRIPTION OF THE DRAWINGS

FIG. 1 is a central vertical cross-sectional view of a device embodying the invention, taken along the line 1—1 of FIG. 2.

FIG. 2 is a top plane view of the device shown in FIG. 1.

FIG. 3 is a sectional view taken along line 3—3 of FIG. 1.

FIG. 4 is a schematic diagram showing a photoelectric detecting and discriminating circuit associated with the invented device.

FIG. 5 is an illustrative plot of current through the detecting circuit of FIG. 4 versus angular displacement between the supporting and supported structures.

DETAILED DESCRIPTION

FIG. 1 through 3

The torque meter shown in these figures includes a supporting structure generally indicated at 8 and a supported structure generally indicated at 9. The only connection between the two structures is through a pair of suspending strings 20 and 21 which may, for example, have the strength and flexibility of a standard fishing line.

The supporting structure 8 includes a vertical cylindrical body 10, a bottom plate 11 and a top plate 12 which together enclose a cavity 13. A Polaroid disc 14 having a central aperture 15 is affixed to the top side of the top plate 12 by means of rivets 16 and 17. A pair of buttons 18 and 19 affixed to the top surface Polaroid disc 14 and spaced equidistantly from its center, support respectively nylon strings 20 and 21, which extend freely through apertures 12a in the plate 12.

The supported structure 9 includes a horizontal bar 22 which is held up by the strings 20 and 21 which pass through suitable apertures in the bar 22 and terminate, at the bottom side of the bar, in anchor cups 23 and 24 respectively. A shaft 25 is rigidly affixed to the center of the bar 22. A portion of the shaft 25 extends vertically downwardly and terminates in a journaled connection 26a at the center of the bottom plate 11. The shaft 25 extends upwardly from the bar 22 and passes slidably and rotatably through an aperture 26 in the top plate 12, where it is journaled, and through a larger diameter aperture 15 in the Polaroid disc 14. A coupler 27 is rigidly affixed to the portion of the shaft 25 which is above the Polaroid disc 14. The coupler 27 has a flange 28 at its bottom end, and a second Polaroid disc 29 is affixed to the bottom side of the flange 28 by means of rivets 29 and 30. When the torque meter is at rest, the facing surfaces of the Polaroid discs 14 and 29 are spaced by a short distance, usually of the order of a fraction of an inch.

The coupler 27 has a central depression 31 at its top end which is designed to accept a driven magnet bar 32. The driven magnet 32 is connected by means of a shaft 33 to an element such as a meter register (not shown). Driving magnets 34 and 35 are held in diametrically opposite relationship in the coupler 27 such that they face the depression 31.

The driving magnets 34 and 35 and the driven magnet 32 comprise a magnetic coupling between the coupler 27 and the shaft 33. The manner of operation of the coupling is not described here because it is known in the art (see, for example, U.S. Pat. No. 3,442,126 to Southall). The magnetic coupling causes the shaft 33 to rotate concurrently with the support 27. When the torque meter is at rest, there is a certain distance between the bottom of the driven magnet 32 and the bottom end of the depression 31. This distance is sufficient to allow the coupler 27 to lift as the torque meter is operated, but to avoid touching the driven magnet 32.

Once both the supporting and supported structures are rotating at the same speed, there is a certain lag between them due to frictional forces on the element under test. The lag is generally less than the transient lag during acceleration. The lag during rotation may vary through one cycle several times in one revolution or only once in a plurality of revolutions, but there is some lag for as long as there are dynamic frictional forces on the element under test.

A stop pin 37 extends upwardly from the bottom plate 11 of the supporting structure 8 where it is suitably affixed, to a height above the level of the bar 22, and serves to prevent the strings 20 and 21 from wrapping around the shaft 25 in case of higher than normal frictional forces on the element under test.

The maximum angular displacement allowed by the stop pin 37 may be set to about 90°. Once the pin 37 engages the bar 22, the bar is thereafter positively driven until the pin again separates from the bar.

For the purpose of detecting the angular displacement, the margins of the Polaroid discs 14 and 29 extend beyond the cylindrical wall 10 of the supporting structure 8, and a light source 40 is suitably supported above the Polaroid disc 29 so as to generate a light beam 41 normal to the Polaroid discs. A photocell detector 50 is suitably supported to a point below the Polaroid discs such that the beam 41 impinges upon its photosensitive face. The beam 41 is diminished in intensity by passage through the Polaroid discs. At least within a certain range of angular displacement between the Polaroid discs 14 and 29, the intensity of the light impinging upon the photocell detector 50 varies as a function of the angular displacement. The angular displacement is, in turn, a function of the torque load on the element under test. The degree of angular displacement is detected and indicated by an electric circuit such as the one illustrated in FIG. 4. The strings 21 may be replaced by any other equivalent limply flexible members, i.e., members which are not resilient, and have substantially zero spring rate.

FIG. 4

The photocell detector 50 is connected to the input terminals of an amplifier 51. Amplifier 51 also has a power supply terminal 51a and an output terminal 51b. Output terminal 51b is connected to a circuit including in series a winding 52a of a low-level current-detecting relay 52, a winding 53a of a high-level current-detecting relay 53, a recorder 54, an in contact 66a of a time-controlled relay 66, and an out contact 67a of another time-controlled relay 67.

The shaft 36 is driven by a motor 55.

The torque load on the shaft 33 varies the output of the photocell 50 and hence in the current flow through the relay windings 52a and 53a. The current flow through these windings is used to control the energization of a low torque signal lamp 56, an acceptable torque signal lamp 57 and a high torque signal lamp 58.

To initiate a test, the operator closes a pushbutton switch 60 completing a circuit from a positive power supply terminal 61 through the pushbutton 60 and the winding of a holding relay 62 to ground. A circuit is also completed through pushbutton 60, a conductor 63, and the motor 55 to ground. Rotation of shaft 36 and indirectly of shaft 33 is thereby initiated.

Energization of relay 62 closes its contact 62a thereby completing holding circuits for that relay and for motor 55, from the power supply terminal 61 through an off pushbutton 65, contact 62a to the winding of relay its Closure of pushbutton 60 also completes a circuit for energizing a winding 66d of a timing relay 66, which after a predetermined time, closes its contacts 66a and 66b. The timing relay 66 has its operating time interval set long enough to allow the motor 55, shaft 36 and the torque load driven by shaft 33 to reach a steady running speed, so that all transient acceleration conditions during the start will be eliminated before the contacts 66a and 66b close.

Another timing relay 67 has a contact 67a closed when the relay winding is deenergized, and operated to open position by winding 67 at a time after the energization of that winding long enough to allow the shaft 36 to complete at least one revolution.

When the contact 66a closes, the contact 67a is already closed. The winding 67 is energized at this time by closure of contact 66b. During the time that the contact 67a remains closed, the contacts 66a and 67a complete the output circuit of amplifier 51, and contacts 66b and 67b prepare energizing circuits for the lamps 56, 57 and 58, placing those lamps under the control of relays 52 and 53. Contacts 66b and 67b at this time also complete a circuit for a holding winding 66c of relay 66. Contact 66b also completes an energizing circuit for relay 67. Note that all circuits through contacts 66b and 67b are independent of the off pushbutton 65, so that once these two contacts are closed, all the circuits controlled by the timing relays 66 and 67 remain closed until they are opened by the action of the timing relay 67. Hence, the test cycle is limited to a period beginning after the torque-testing apparatus has reached a steady speed and continuing through an interval determined by the setting of timing relay 67. Typically, this interval will be one revolutin of the shaft 36, but may be several revolutions or any other selected interval.

Relay 52 operates normally open contacts 52b and 52c and a normally closed contact 52d. By "normally open" it is meant that the contact is open when the relay windings are deenergized and by "normally closed" it is meant that the contact is closed when the relay winding is deenergized. Relay 53 operates normally closed contacts 53b and 53c and normally open contacts 53a and 53e.

If the torque of the load on shaft 33 remains in the low range, the current flow through winding 52a is insufficient to cause the relay 52 to pick up its contacts and the low torque signal lamp 56 is energized as soon as contact 67b is closed and remains energized until that contact opens.

If the torque load on the shaft 33 is in the acceptable range, the winding 52a of relay 52 is energized sufficiently so that it picks up its contacts, but winding 53a of relay 53 is not energized sufficiently to pick up its contacts. A circuit is then completed for lamp 57, through contact 52c, contact 53b and contact 67b. Energization of relay 52 also closes contact 52b, completing an energizing circuit for a holding winding 52e, which also extends through a back contact 53c of relay 53. Thus, once the relay 52 has picked up its contacts during a test, those contacts will remain picked up until the end of the test.

If the torque load encountered is in the high range, above the acceptable limit, then winding 53a of relay 53 will be energized sufficiently to pick up the contacts of that relay, thereby breaking the holding circuit for the acceptable signal lamp 56 and completing at contact 53d an energizing circuit for the high torque lamp 58. At the same time, contact 53e completes a circuit for a holding winding 53f of relay 53, together with a holding circuit for the lamp 58.

Summarizing, if lamp 57 becomes energized during a test, then it remains energized until pushbutton 65 is actuated unless a high torque indication is received to energize the lamp 58, in which case the lamp 57 is deenergized. Once a high torque indication is received, lamp 58 is energized and remains energized until pushbutton 65 is actuated unless a high torque indication is received to energize the lamp 58, in which case the lamp 57 is deenergized. Once a high torque indication is received, lamp 58 is energized and remains energized until operation of the off pushbutton 65.

While the sensitivity of the circuit to torque variations is terminated when contacts 67a and 67b open, the lamps 57 and 58 hold their indications until the pushbutton 65 is actuated.

The particular relay circuit illustrated is only one of numerous circuit arrangements which could be used to carry out this invention.

FIG. 5

Assume that, at rest, the polarization axes of the discs 14 and 29 are at a 135°angle to each other and that at that time the amount of light impinging on the photoelectric FET 50 causes it to conduct current at value $I_2$. As the angular displacement between polarization axis of the discs 14 and 29 moves closer to 180°, the current through the FET 50 increases; and the angular displacement moves closer to 90°, the current decreases (the maximum range of angular displacement is limited to within 90° by the stop pin 37).

A certain current range say the range between current values $I_1$ and $I_3$ corresponds to the chosen of acceptable of acceptable torque (for example, torque between 0.5 and 5 gram-centimeters may be termed acceptable). Current below the value $I_1$ corresponds to unacceptably low torque, indicating as one possibility that the element under test is not properly coupled to the torque meter; and current value about $I_3$ corresponds to unacceptably high torque indicating unacceptably high frictional forces on the element under test.

While the recorder 54 measures absolute instantaneous values of torque during the test, the signal lamps 56, 57 and 58 cooperate to indicate the maximum value of torque encountered during a test. For example, if the test continues only through one revolution, and a torque out of the acceptable range is measured at one point in the revolution, then the lamp 58 will stay on, indicating the maximum torque encountered, rather than any average value.

I claim:

1. A device for measuring the torque load on a rotatable element comprising:
   a. a supported structure (9) rotatable about a substantially vertical axis and connected to said element for concurrent rotation therewith;
   b. a supporting structure (8) rotatable about said axis;
   c. simply flexible means (20, 21) suspending the supported structure (9) from the supporting structure (8);
   d. means (36) for rotating the supporting structure about its axis; and
   e. means (50) for detecting an angular displacement between the two structures, said displacement being indicative of the torque load on said element.

2. A device as in claim 1 wherein:
said flexible means comprises at least two limply flexible elongated members (20, 21) attached to the second structure (8) and extending downwardly therefrom for suspending the first structure (9).

3. A device for detecting the torque transmitted between a vertical driving shaft (36) terminating in an upper end and a vertical driven shaft (25), said device comprising a supporting structure (8) including a frame (10) attached to the upper end of the driving shaft and adapted to rotate therewith, said frame having a top plate (12) and means defining an opening (26) through said top plate, flexible means (20, 21) suspended from the top plate within said frame and supporting a rigid bar (22), said driven shaft being rigidly attached to said bar and passing slidably through said opening in the top plate, and means (14, 29, FIG. 4) for detecting the relative angular position of said driving shaft and said driven shaft as an indication of the transmitted torque.

UNITED STATES PATENT OFFICE
CERTIFICATE OF CORRECTION

Patent No. 3,603,144    Dated September 7, 1971

Inventor(s) EDWARD C. SMITH

It is certified that error appears in the above-identified patent and that said Letters Patent are hereby corrected as shown below:

Column 3, line 52, "its" should read --62.--.

Column 4, line 9, "revolutin" should read --revolution--.

Column 4, line 18, "53a" should read --53d--.

Column 4, line 39, "56" should read --57--.

Column 4, line 73, "of acceptable" (first occurance) should read --range--.

Column 5, line 21, "simply" should read --limply--.

Signed and sealed this 4th day of July 1972.

(SEAL)
Attest:

EDWARD M. FLETCHER, JR.
Attesting Officer

ROBERT GOTTSCHALK
Commissioner of Patents